No. 662,834. Patented Nov. 27, 1900.
BARON PAUL TCHERKASSOV.
TOUCH TYPE WRITING KEYBOARD.
(Application filed June 9, 1900.)
(No Model.)
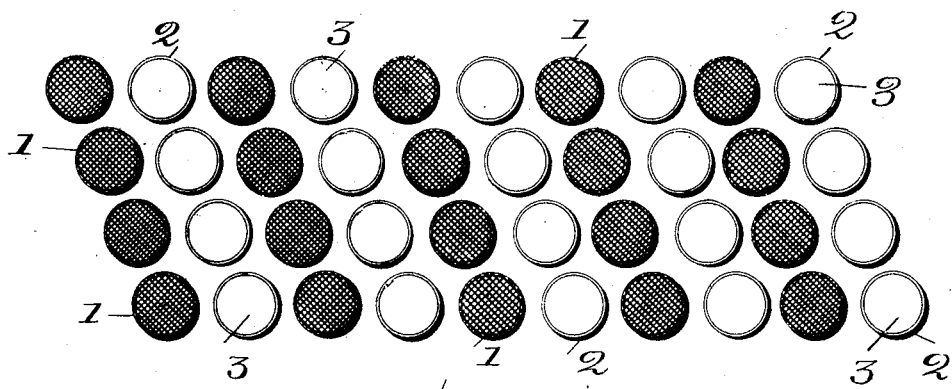
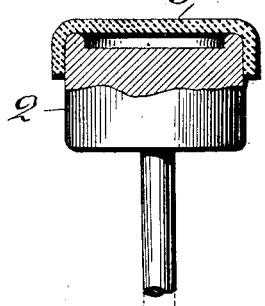
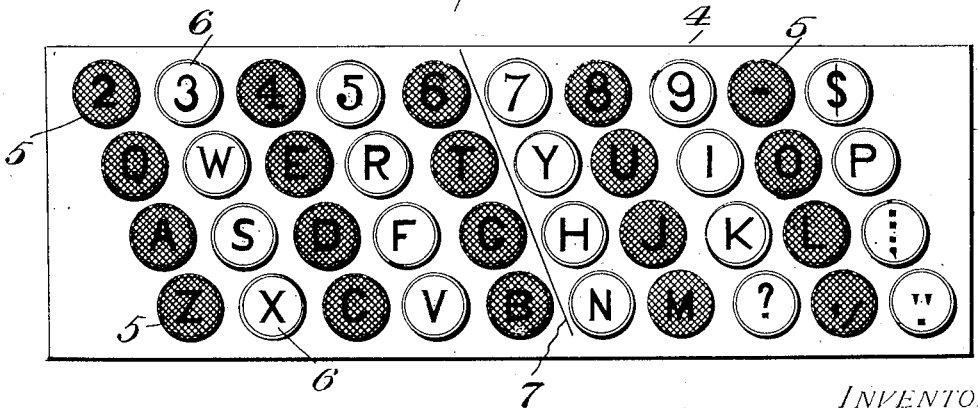
WITNESSES:
L. C. Hills.
Edwin King Lundy
INVENTOR
Baron Paul Tcherkassov
BY Evella Dick
his Attorney
THE NORRIS PETERS CO., PHOTO-LITHO., WASHINGTON, D. C.

UNITED STATES PATENT OFFICE.

BARON PAUL TCHERKASSOV, OF ST. PETERSBURG, RUSSIA.

TOUCH-TYPE-WRITING KEYBOARD.

SPECIFICATION forming part of Letters Patent No. 662,834, dated November 27, 1900.

Application filed June 9, 1900. Serial No. 19,705. (No model.)

*To all whom it may concern:*

Be it known that I, BARON PAUL TCHERKASSOV, a subject of the Russian Emperor, residing at St. Petersburg, Russia, have invented certain new and useful Improvements in Touch-Type-Writing Keyboards, of which the following is a specification.

My invention relates to touch type-writing, the object of the same being to provide certain improvements in type-writing machines whereby the different letters or characters on the keyboard may be distinguished and selected by the touch rather than by the sight of the operator.

In carrying out my invention different kinds of blank key-tops are distributed in sets on the keyboard, the tops of one set being distinguished from those of the other sets by certain characteristics which appeal to the touch of the operator.

The details of my invention will be set forth hereinafter, and the novel features thereof will be defined in the claims.

In the drawings forming part of this specification, Figure 1 is a plan view of a standard keyboard arranged according to my invention. Fig. 2 is a detail sectional view of one of the key-tops having a cap thereon, and Fig. 3 is a face view of the index or letter-plate employed for the purpose of facilitating the learning of the keyboard.

Like reference-numerals indicate like parts in the different views.

As indicated in the drawings, the key-tops 1 2 are arranged in sets on the keyboard, each of said key-tops being perfectly blank. The surfaces of the tops 1 are preferably black, with a glazed or smooth finish, and the surfaces of the tops 2 are preferably white, with an unglazed or rough finish. Instead of having the tops 1 and 2, however, black and white they may be made of any other distinctive colors. The object of making them of distinctive colors is to facilitate the operation of the keys at the beginning, before the arrangement of the keyboard is thoroughly mastered by the operator. To produce the glazed or smooth surface, I may make the key-tops of glazed rubber, glass, hard rubber, or the like, or any other suitable material, and to produce the unglazed or rough surface on the key-tops 2 I propose to secure thereto caps 3 of rubber. It is obvious that the difference between the key-tops 1 and 2 is readily distinguishable by the touch of the operator, and it is also obvious that instead of making said key-tops as described they may be made in any other way so long as they are relatively smooth and rough and thereby distinguishable by the touch or tact of the operator.

In order to facilitate the learning of the keyboard, I provide what I term an "index" or "letter-plate" 4, (shown in detail in Fig. 3 of the drawings.) This letter-plate, as shown, contains a reproduction of the keyboard, in which the letters 5, corresponding to the different sets of key-tops 1, are printed in white upon a dark background, whereas the letters 6, corresponding to the different sets of key-tops 2, are printed in black upon a white background. Instead of these particular colors, however, any other distinctive colors may be employed. The sets of key-tops 1 are arranged alternately across the keyboard, as are the sets of letters 5 on the index or letter-plate 4. The sets of key-tops 2 are also arranged alternately across the keyboard and are located between the sets of key-tops 1. The letters 6 on the index or letter-plate corresponding to the key-tops 2 of the keyboard are similarly arranged. It will be observed that by the use of the index or letter-plate 4 it will be a very simple matter to operate the machine even at the start with the blank key-tops, and after a short space of time the operator may discard altogether said index or letter-plate.

In connection with the foregoing other auxiliary devices may of course be employed in order to further facilitate the learning and operating of the blank keyboard. Among these may be mentioned a central line 7 on the letter-plate 4 in some distinctive color, which divides the letter-plate into two equal parts. On the keyboard, to correspond with the line 7, the central row of key-tops, where an uneven number of keys per bank is employed, may be of a special shape differing from the remaining keys.

Having now described my invention, what I claim as new, and desire to secure by Letters Patent, is—

1. In a type-writing machine, a keyboard made up of a number of blank key-tops arranged in sets, the tops in one set being relatively smooth and those in another set being relatively rough, whereby one set is distinguishable from another by the touch of the operator.

2. In a type-writing machine, a keyboard made up of a number of blank key-tops arranged in sets alternating with each other, the tops in one set being relatively smooth and those in another set being relatively rough, whereby one set is distinguishable from the next adjacent set or sets by the touch of the operator.

3. In a type-writing machine, a keyboard made up of a number of blank key-tops arranged in sets alternating one with the other across the keyboard, the tops of one set being relatively smooth and those in the adjacent set or sets being relatively rough, and thereby distinguishable by the touch of the operator, and the tops in one set being also of a distinctive color from those in the next set or sets.

4. In a type-writing machine, a keyboard made up of a number of blank key-tops arranged in sets across the keyboard, the tops in one set having smooth or polished surfaces and those in another set having rough or unpolished surfaces whereby one set is distinguishable from another set by the touch of the operator.

5. In a type-writing machine, a keyboard made up of a number of blank key-tops arranged in sets, the tops in one set having relatively smooth surfaces and those in another set having caps of rubber thereon producing relatively rough surfaces.

In testimony whereof I have hereunto set my hand this 17th day of May, 1900.

BARON PAUL TCHERKASSOV.

Witnesses:
  H. LOVIAGUINE,
  E. LOURIE.